United States Patent
Ni (10) Patent No.: US 8,885,001 B2
(45) Date of Patent: Nov. 11, 2014

(54) REDUCING POWER CONSUMPTION FOR A MOBILE TERMINAL

(75) Inventor: Yong Ni, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 13/456,434

(22) Filed: Apr. 26, 2012

(65) Prior Publication Data

US 2012/0293477 A1    Nov. 22, 2012

(30) Foreign Application Priority Data

May 19, 2011    (CN) .......................... 2011 1 0130434

(51) Int. Cl.
- *G09G 5/02* (2006.01)
- *G06F 1/32* (2006.01)
- *G09G 5/00* (2006.01)

(52) U.S. Cl.
CPC ............... *G06F 1/32* (2013.01); *G06F 1/3265* (2013.01); *Y02B 60/1242* (2013.01); *G09G 5/00* (2013.01)
USPC .......................................... 345/699; 345/211

(58) Field of Classification Search
CPC .......... G09G 5/38; G09G 5/373; G09G 5/391
USPC ........................................ 345/211, 698, 699
See application file for complete search history.

(56) References Cited

U.S. PATENT DOCUMENTS

| 6,882,332 | B2 | 4/2005 | Zeiter et al. | |
| 7,552,349 | B2 * | 6/2009 | Hassan et al. | 713/320 |
| 7,786,988 | B2 | 8/2010 | Plut | |
| 8,013,848 | B2 * | 9/2011 | Miyazawa | 345/204 |
| 8,237,746 | B2 * | 8/2012 | Betts-LaCroix | 345/670 |
| 8,350,989 | B2 * | 1/2013 | Ohashi et al. | 349/65 |
| 2003/0179243 | A1 | 9/2003 | Numano | |
| 2010/0180228 | A1 | 7/2010 | Ben-Harrush et al. | |
| 2010/0231610 | A1 | 9/2010 | Hoffman et al. | |

FOREIGN PATENT DOCUMENTS

| CN | 1940804 A | 4/2007 |
| CN | 101751864 A | 6/2010 |

* cited by examiner

*Primary Examiner* — Ricardo L Osorio (74) *Attorney, Agent, or Firm* — Winstead, P.C.

(57) ABSTRACT

A method, system and computer program product for saving power for a mobile terminal. Configuration parameters of a first virtual screen are obtained in response to the occurrence of a first trigger event, where the first virtual screen is at least part of the screen of the mobile terminal. The scope of the first virtual screen is determined according to the configuration parameters of the first virtual screen. Data to be displayed on the screen of the mobile terminal is displayed within the determined scope of the first virtual screen. The display of the screen of the mobile terminal is closed outside the determined scope of the first screen. By realizing a virtual screen and using only part of the screen of the mobile terminal for displaying, there is a reduction in the power consumed by the screen display so that the battery life of the mobile terminal is improved.

25 Claims, 4 Drawing Sheets

REDUCING POWER CONSUMPTION FOR A MOBILE TERMINAL

CROSS-REFERENCE TO RELATED APPLICATIONS

This application claims priority under 35 U.S.C. §119(a) from Chinese Patent Application No. 201110130434.X, filed on May 19, 2011, the contents of which are incorporated herein by reference.

TECHNICAL FIELD

The present invention relates generally to mobile terminals, and more particularly, to reducing power consumption for a mobile terminal.

BACKGROUND

Currently, smart mobile terminals are developing towards having bigger screen displays and full touch screen capability. The big screen display and full touch screen capability are characterized in being able to realize various mobile web applications on a mobile terminal and improving the user's experience. However, an ensuing problem results in that the power consumption of such mobile terminals gradually becomes prominent, especially for mobile terminals containing a big screen display with high resolution which consumes too much power so that the battery life of the mobile terminal is reduced and is unable to support long time use of the mobile terminal by the user.

Attempts have been made to address the problem of low battery life of mobile terminals, such as reducing the working frequency and voltage of the chip so as to reduce the power consumption of the chip, or using dynamic power management (DPM), i.e., optimizing the system's overall power consumption by selectively placing idle system components into a low power consumption state, or optimizing the code of the software system so as to reduce the calculation complexity and achieve the objective of optimization of the overall power consumption of the system.

Other attempts to address the problem of low battery life caused by having a big screen display include using an external photosensitive device to automatically adjust the screen luminance by sensing external lights, or closing the screen display when the screen has been in a still state for more than a certain time threshold, etc.

Although the above various technical measures have been used, the problem of reduced battery life caused by a big screen display has not been alleviated prominently.

BRIEF SUMMARY

In one embodiment of the present invention, a method for saving power for a mobile terminal, the method comprises obtaining configuration parameters of a first virtual screen in response to an occurrence of a first trigger event, where the first virtual screen is at least part of a screen of the mobile terminal. The method further comprises determining a scope of the first virtual screen according to the configuration parameters of the first virtual screen. Additionally, the method comprises displaying contents to be displayed on the screen of the mobile terminal within the determined scope of the first virtual screen. In addition, the method comprises closing, by a processor, the display of the screen of the mobile terminal outside the determined scope of the first virtual screen.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

By using the embodiments of the present invention, and realizing a virtual screen and using only part of the screen of the mobile terminal to display, the objective of reducing the power consumption caused by the screen display is achieved, so that the battery life of the mobile terminal is improved. Moreover, the mobile terminal can further adjust the display of the virtual screen dynamically in response to screen switching, thus guaranteeing the user experience while improving the battery life of the mobile terminal.

Exemplary embodiments of the present disclosure will be described below in conjunction with the accompanying drawings. For clarity and simplicity, the specification will not describe all the features of actual implementations. However, it should be understood that during developing any such actual embodiments, many decisions specific to such actual implementation have to be made, so as to realize the developers' specific objectives, such as, complying with the constraints related to the system and business, which constraints may change with different implementations. In addition, it should also be appreciated that although the development work may be complex and time consuming, for those skilled in the art having the benefit of the disclosed contents of the present disclosure, such development work is only a routine task.

Here it should also be appreciated that in order to avoid blurring the present disclosure by unnecessary details, the accompanying drawings only show apparatus structures and/or processing steps closely related to the solutions of the present disclosure, while omit other details with little relevance to the present disclosure.

Figure 1:
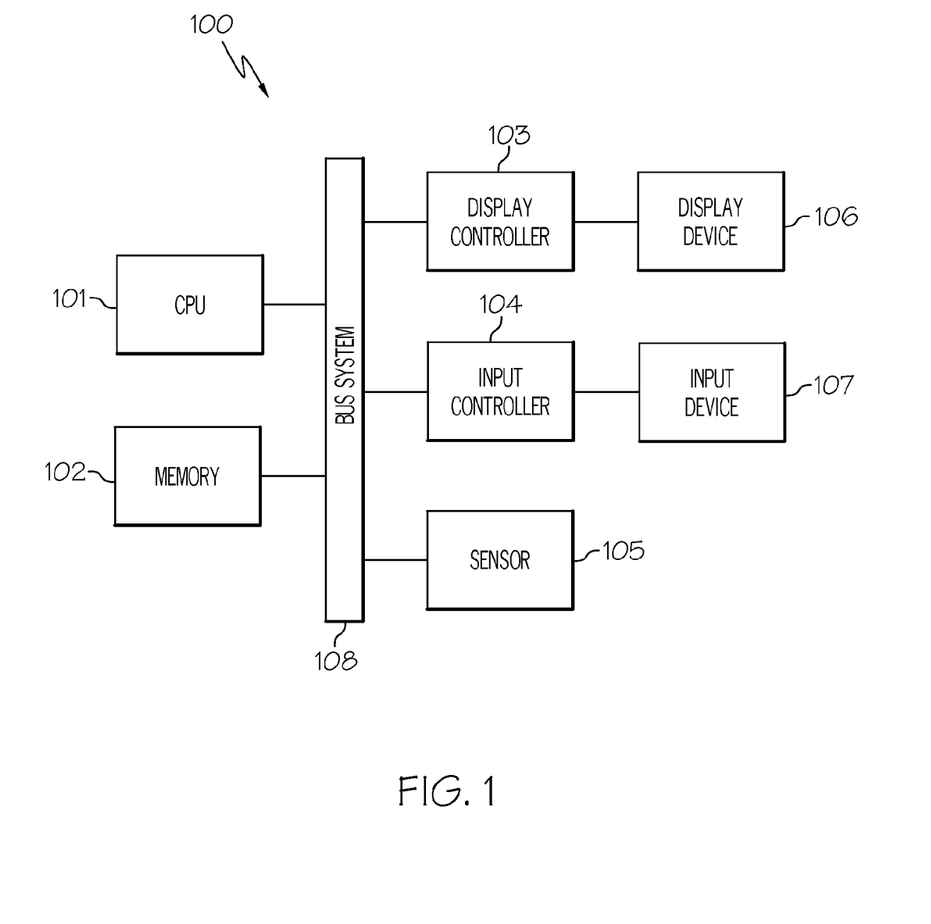
FIG. 1 illustrates a block diagram of an exemplary mobile terminal suitable for realizing an implementation of the present disclosure.

Now referring to FIG. 1, FIG. 1 illustrates a block diagram of an exemplary mobile terminal 100 suitable for realizing an implementation of the present disclosure. As shown, the mobile terminal 100 may include: a CPU 101, a memory unit 102, a display controller 103, a user input controller 104, a sensor unit 105, a display device 106, a user input device 107 and a bus system 108 connecting the various units, wherein the display controller 103 controls the display device 106 of the mobile terminal, the user input controller 104 controls the user input device 107, such as, a keyboard, a touch screen, etc. The sensor unit 105 is for sensing state changes of the mobile terminal. It should be appreciated that the structural block diagram of FIG. 1 is showed for exemplary purpose rather than as a limitation to the scope of the present disclosure. In some cases, some components may be added or removed according to specific conditions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Figure 2:
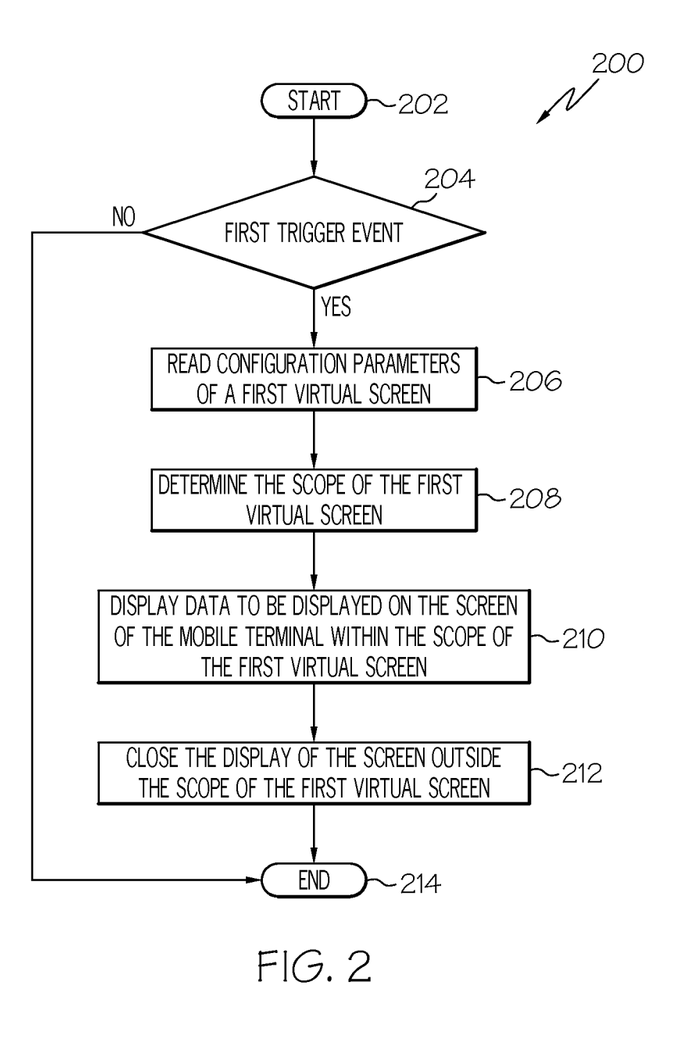
FIG. 2 illustrates a method for saving power for the mobile terminal according to an embodiment of the present disclosure.

Referring now to FIG. 2, FIG. 2 illustrates a power saving method 200 for a mobile terminal according to an embodiment of the present disclosure. The power saving method 200 for the mobile terminal as shown in FIG. 2 starts from step 202. Next, the power saving method 200 for the mobile terminal enters into step 204, wherein it is determined whether a first trigger event occurs. The first trigger event is a predetermined system event for triggering the initiation of a virtual screen, e.g., it may be that the remaining power amount of the system achieves a certain threshold (e.g., less than 20%), or it may be that a virtual screen mode is initiated. The first trigger event may also be any other type of event that can trigger the initiation of the virtual screen mode, which types of events are not enumerated here. Herein, a virtual screen is in contrast with the screen of the mobile terminal, and the virtual screen is at least part of the screen of the mobile terminal. For example, assuming the screen of the mobile terminal includes 900*600 pixel dots, then the virtual screen is part of the 900*600 pixel dots, e.g., it may be 600*400 pixel dots therein.

Next, in response to the occurrence of the first trigger event, i.e., the determining result in step 204 being "YES," the method 200 enters into step 206, wherein configuration parameters of the first virtual screen are obtained. According to an embodiment of the present disclosure, the configuration parameters of the first virtual screen include the position of the virtual screen, and they may also include the position and size of the virtual screen. The position of the virtual screen defines the position of the virtual screen in the screen of the mobile terminal, and it may be denoted by the absolute coordinates of the boundary points, or denoted by the absolute coordinates of a boundary point together with the relationships between other boundary points and this boundary point. The size of the virtual screen defines the magnitude of the virtual screen. According to another embodiment of the present disclosure, the configuration parameters of the first virtual screen also include an adjustable physical parameter of the virtual screen, such as, the brightness, contrast, etc. According to another embodiment of the present disclosure, the configuration parameters of the first virtual screen further include a priority of the first virtual screen. The priority of the virtual screen will be further described while describing screen switching.

Next, the method 200 enters into step 208, wherein the scope of the first virtual screen is determined according to the configuration parameters of the first virtual screen. As previously described, the configuration parameters of the first virtual screen may include the position and size of the virtual screen, and the scope of the first virtual screen, i.e., the position of the region that the first virtual screen occupies on the screen of the mobile terminal, can be determined according to the position and size of the virtual screen.

Next, the method 200 enters into step 210, wherein the contents to be displayed on the screen of the mobile terminal are displayed within the determined scope of the first virtual screen. According to an embodiment of the present disclosure, displaying the contents to be displayed on the screen of the mobile terminal within the determined scope of the first virtual screen comprises: determining whether the contents go beyond the determined scope of the first virtual screen. This can be realized by capturing the data to be sent to a frame buffer to obtain the contents to be displayed on the screen of the mobile terminal, and by further comparing the physical screen pixel scope of the contents with the physical screen pixel scope of the first virtual screen. According to an embodiment of the present disclosure, if the determining result indicates that the contents go beyond the determined scope of the first virtual screen, the contents may be amended to display all the contents within the determined scope of the first virtual screen. This can be realized by scaling the contents. According to another embodiment of the present disclosure, if the determination result indicates that the contents go beyond the determined scope of the first virtual screen, part of the contents may be displayed within the determined scope of the first virtual screen. Various approaches may be used to display part of the contents within the determined scope of the first virtual screen, e.g., upper-left, or bottom-right alignment, or any other approaches may be used to display. For the parts that exceed the determined scope of the first virtual screen and thus are not displayed, a scroll bar may be provided to view the parts that are not displayed in a scrolling manner.

Next, the method 200 enters into step 212, wherein the display of the screen of the mobile terminal outside the determined scope of the first virtual screen is closed. If the screen of the mobile terminal is an OLED screen, the display of the screen of the mobile terminal outside to the determined scope of the first virtual screen can be closed by controlling to cut off the power supply to the pixel dots outside the determined scope of the first virtual screen. As for how to control to cut off the power supply to pixel dots of an OLED screen, refer to U.S. Pat. No. 7,786,988B2, incorporated herein in its entirety. If the screen of the mobile terminal is an LCD screen, backlight can be provided to the determined scope of the first virtual screen according to the distribution of the backlight source of the screen, while no backlight is provided to the scope outside the determined scope of the first virtual screen, so as to realize closing the display of the screen of the mobile terminal outside the determined scope of the first virtual screen. Next, the method 200 ends at step 214.

Referring to step 204, if, however, there is not a first trigger event, i.e., the determining results in step 204 being "NO," then the method 200 ends at step 214.

In some implementations, method 200 may include other and/or additional steps that, for clarity, are not depicted. Further, in some implementations, method 200 may be executed in a different order presented and that the order presented in the discussion of FIG. 2 is illustrative. Additionally, in some implementations, certain steps in method 200 may be executed in a substantially simultaneous manner or may be omitted.

It can be seen from the detailed description of the power saving method for a mobile terminal according to an embodiment of the present disclosure that, after the first virtual screen is initiated in response to the first trigger event, since the display of the screen of the mobile terminal outside the determined scope of the first virtual screen is closed, the power consumption of the screen is reduced, and the objective of improving the battery life is achieved.

Figure 3:
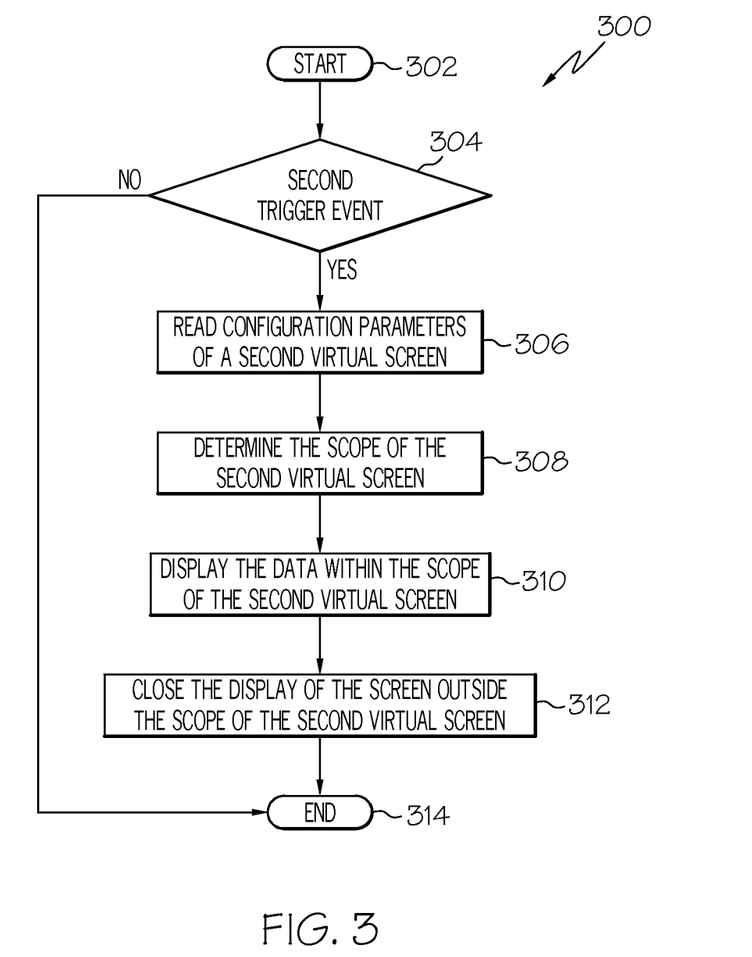
FIG. 3 illustrates a method for saving power when the mobile terminal is in the state of displaying the contents within the scope of the first virtual screen according to an embodiment of the present disclosure.

Now referring to FIG. 3, it shows a power saving method 300 for a mobile terminal according to another embodiment of the present disclosure. The power saving method 300 for a mobile terminal as shown in FIG. 3 starts from step 302, or starts in response to the end of the power saving method 200 for a mobile terminal as shown in FIG. 2. That is, it starts when the mobile terminal is in the state of displaying the contents within the scope of the first virtual screen according to the power saving method for a mobile terminal as shown in FIG. 2. Next, the power saving method 300 for a mobile terminal enters into step 304, wherein it is determined whether a second trigger event occurs. The second trigger event is a predetermined system event for triggering a virtual screen change, e.g., it may be that the system receives a command for adjusting the position and size of the virtual screen by the user manually, or it may be that the system detects that the mobile device is placed from a vertical position to a horizontal position, or vice-versa, or it may also be that the system detects that the application window has changed, and others which are not enumerated here.

Next, in response to the occurrence of the second trigger event, that is, the determination result of step 304 being "YES," the method 300 enters into step 306, wherein configuration parameters of the second virtual screen are obtained. Similarly, according to an embodiment of the present disclosure, the configuration parameters of the second virtual screen include the position and size of the second virtual screen, wherein, the position of the second virtual screen defines the position of the second virtual screen in the screen of the mobile terminal, and it may be denoted by the absolute coordinates of the boundary points, or denoted by the absolute coordinate of some boundary point together with the relationships between other boundary points and the boundary point. The size of the second virtual screen defines the magnitude of the virtual screen. According to another embodiment of the present disclosure, the configuration parameters of the second virtual screen further includes an adjustable physical parameter of the second virtual screen, e.g., the brightness, contrast, etc. According to another embodiment of the present disclosure, the configuration parameters of the second virtual screen further includes a priority of the virtual screen. According to an embodiment of the present disclosure, in response to obtaining the configuration parameters of the second virtual screen, it is further determined whether the priority in the configuration parameters of the second virtual screen is higher than the priority in the configuration parameters of the original first virtual screen. If the determination result indicates that it is higher than the priority in the configuration parameters in the original first virtual screen, then the scope of the second virtual screen is further determined according to the configuration parameters of the second virtual screen. If the determination result indicates that it is not higher than the priority in the configuration parameters of the original first virtual screen, then the original first virtual screen remains unchanged. Especially, if the second trigger event is the system receiving a command for adjusting the position and size of the virtual screen by the user manually, then the configuration parameters of the second virtual screen are the position and size of the virtual screen after being adjusted by the user; if the second trigger event is the system detecting that the mobile device is placed from a vertical state to a horizontal state, or vice-versa, then the configuration parameters of the second virtual screen are the position and size of the virtual screen corresponding to when the mobile device has been placed horizontally, or vice-versa. If the second trigger event is the system detecting that the application window has changed, then the configuration parameters of the second virtual screen are the position and size of the virtual screen corresponding to the changed application window.

Next, the method 300 enters into step 308, wherein the scope of the second virtual screen is determined according to the configuration parameters of the second virtual screen. As described above, the configuration parameters of the second virtual screen may include the position and size of the second virtual screen, and the scope of the second virtual screen, i.e., the position of the region that the second virtual screen occupies in the screen of the mobile terminal, can be determined according to the position and size of the second virtual screen. Next, the method 300 enters into step 310, wherein data are displayed in the determined scope of the second virtual screen. According to an embodiment of the present disclosure, displaying data in the determined scope of the second virtual screen comprises: determining whether the display contents corresponding to the data go beyond the determined scope of the second virtual screen. This can be realized by capturing the data to be sent to a frame buffer to obtain the data to be displayed on the screen of the mobile terminal, and further by comparing the physical screen pixel scope of the display contents corresponding to the obtained data with the physical screen pixel scope of the second virtual screen. According to an embodiment of the present disclosure, if the determination result indicates that the display contents corresponding to the obtained data go beyond the determined scope of the second virtual screen, then all the display contents corresponding to the intercepted data may be displayed within the determined scope of the second virtual screen. This can be realized by scaling the display contents corresponding to the obtained data. According to another embodiment of the present disclosure, if the determination result indicates that the display contents corresponding to the intercepted data go beyond the determined scope of the second virtual screen, part of the display contents corresponding to the intercepted data may be displayed within the determined scope of the second virtual screen. Various approaches may be used to display part of the display contents corresponding to the obtained data within the determined scope of the second virtual screen, e.g., upper-left or bottom-right alignment, or any other approaches may be used to display. For the parts that are not displayed due to exceeding the determined scope of the second virtual screen, a scroll bar may be provided so that the parts that are not displayed can be viewed in a scrolling manner.

Next, the method 300 enters into step 312, wherein the display of the screen of the mobile terminal outside the determined scope of the second virtual screen is closed. If the screen of the mobile terminal is an OLED screen, the display of the screen of the mobile terminal outside the determined scope of the second virtual screen can be closed by controlling to cut off the power supply to the pixel dots outside the determined scope of the second virtual screen. As for how to control to cut off the power supply of pixel dots of an OLED screen, refer to U.S. Pat. No. 7,786,988B2, incorporated herein in its entirety. If the screen of the mobile terminal is an LCD screen, backlight may be provided to the determined scope of the second virtual screen according to the distribution of the backlight source of the screen, while no backlight is provided to the scope outside the determined scope of the second virtual screen, so as to realize closing the display of the screen of the mobile terminal outside the determined scope of the second virtual screen. Next, the method 300 ends at step 314.

Referring to step 304, if, however, there is not a second trigger event, i.e., the determining results in step 304 being "NO," then the method 300 ends at step 314.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Figure 4:
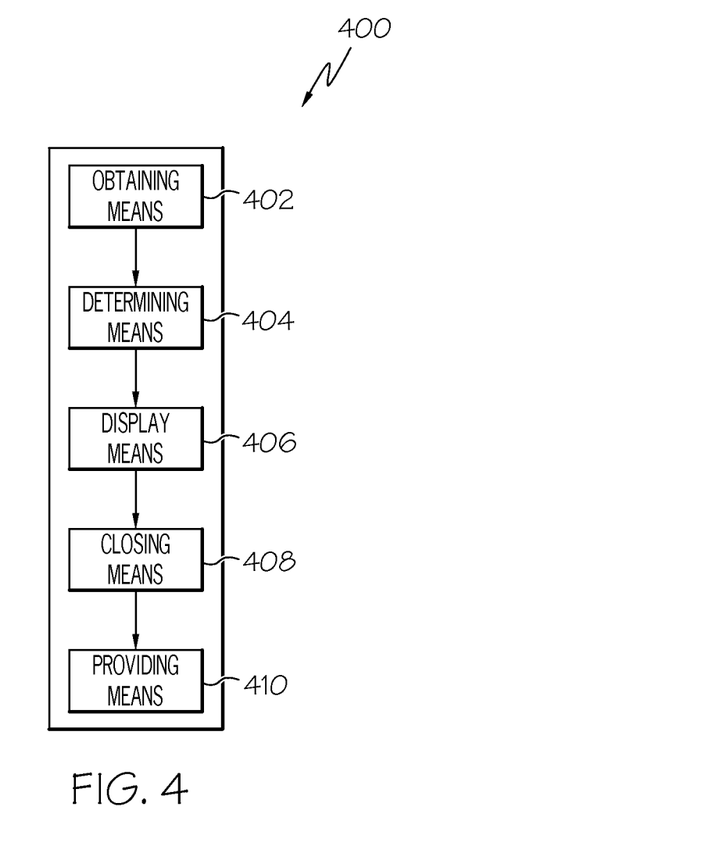
FIG. 4 illustrates a power saving system for the mobile terminal according to an embodiment of the present disclosure.

Now referring to FIG. 4, FIG. 4 shows a power saving system 400 for a mobile terminal according to an embodiment of the present disclosure, comprising: obtaining means 402 configured to read user configurations in response to the occurrence of a first trigger event, wherein the user configuration includes configuration parameters of a first virtual screen, wherein the first virtual screen is at least part of the screen of the mobile terminal; determining means 404 configured to determine the scope of the first virtual screen according to the configuration parameters of the first virtual screen; display means 406 configured to display data to be displayed on the screen of the mobile terminal within the determined scope of the first virtual screen; and closing means 408 configured to close the display of the screen of the mobile terminal outside the determined scope of the first virtual screen.

According to an embodiment of the present disclosure, the display means 406 is further configured to determine whether the display contents corresponding to the data go beyond the determined scope of the first virtual screen. According to an embodiment of the present disclosure, in response to the data going beyond the determined scope of the first virtual screen, the display means 406 is further configured to display all the display contents corresponding to the data within the determined scope of the first virtual screen. According to an embodiment of the present disclosure, in response to the data going beyond the determined scope of the first virtual screen, the display means 406 is further configured to display part of the display contents corresponding to the data within the determined scope of the first virtual screen. According to an embodiment, it further comprises providing means 410 configured to provide a scroll bar to view the parts of the display contents corresponding to the data that are not displayed in a scrolling manner.

According to an embodiment of the present disclosure, the obtaining means 402 is further configured to obtain configuration parameters of a second virtual screen in response to the occurrence of a second trigger event. The second trigger event is a predetermined system event for triggering a change of the virtual screen, e.g., it may be the system receiving a command for adjusting the position and size of the virtual screen by the user manually, or it may be the system detecting that the mobile device is placed from a vertical state to a horizontal state, or vice-versa, or it may be the system detecting that the application window has changed, and others which are not enumerated here. Especially, if the second trigger event is that the system receiving the command for adjusting the position and size of the virtual screen by the user manually, then the configuration parameters of the second virtual screen are the position and size of the virtual screen after being adjusted by the user; if the second trigger event is the system detecting that the mobile device is placed from a vertical state to a horizontal state, or vice-versa, then the configuration parameters of the second virtual screen are the position and size of the virtual screen corresponding to when the mobile device is placed horizontally, or vice-versa. If the second trigger event is the system detecting that the application window has changed, then the configuration parameters of the second virtual screen are the position and size of the virtual screen corresponding to when the application window has changed. The determining means 404 is further configured to determine the scope of the second virtual screen according to the configuration parameters of the second virtual screen; the displaying means 406 is further configured to display the data within the determined scope of the second virtual screen; and the closing means 408 is further configured to close the display of the screen of the mobile terminal outside the determined scope of the second virtual screen.

The basic principles of the present disclosure have been described above in conjunction with the specific embodiments. However, it should be pointed out that for those of ordinary skill in the art, it can be appreciated that all or any steps or components of the method and apparatus of the present disclosure can be realized in hardware, software or a combination thereof in any computing device (including a processor and storage medium) or a network of computing devices. This can be realized by those of ordinary skill in the art using their basic programming skills after having read the description of the present disclosure.

It should also be pointed out that in the apparatus and method of the present disclosure, the components or steps can be split and/or recombined. Such splitting and/or recombination should be viewed as equivalent solutions of the present disclosure. Moreover, the steps for executing the above series of processes can naturally be performed in the order of time according to the sequence of illustration, but they are not necessarily performed according to the order of time. Some steps may be executed in parallel or independent from each other.

Although the present disclosure and its advantages are described in great detail, it should be appreciated that various changes, replacements and variations can be made without departing from the spirit and scope of the present disclosure as defined by the appended claims. Moreover, the terms, "comprise", "include" or any other variants in the present application are intended to cover nonexclusive inclusion, so that a process, method, article or apparatus including a series of elements may not only include those elements, but may also include other elements not stated explicitly, or include elements inherent to the process, method, article or apparatus. When there is no other limitation, an element defined by the sentence "comprising a" does not exclude the existence of other same elements in the process, method, article or apparatus including the element.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for saving power for a mobile terminal, the method comprising:
   obtaining configuration parameters of a first virtual screen in response to an occurrence of a first trigger event, wherein the first virtual screen is at least part of a screen of the mobile terminal;
   determining a scope of the first virtual screen according to the configuration parameters of the first virtual screen;
   displaying contents to be displayed on the screen of the mobile terminal within the determined scope of the first virtual screen; and
   closing, by a processor, the display of the screen of the mobile terminal outside the determined scope of the first virtual screen;
   wherein the displaying of the contents to be displayed on the screen of the mobile terminal within the determined scope of the first virtual screen comprises:
      determining whether the contents go beyond the determined scope of the first virtual screen.

2. The method as recited in claim 1, wherein the configuration parameters of the first virtual screen comprise a position of the first virtual screen.

3. The method as recited in claim 1, wherein the configuration parameters of the first virtual screen comprise an adjustable physical parameter of the first virtual screen.

4. The method as recited in claim 1 further comprising:
   in response to the contents going beyond the determined scope of the first virtual screen, amending the contents so as to display all the contents within the determined scope of the first virtual screen.

5. The method as recited in claim 1 further comprising:
   in response to the contents going beyond the determined scope of the first virtual screen, displaying part of the contents within the determined scope of the first virtual screen.

6. The method as recited in claim 5 further comprising:
   providing a scroll bar so as to view parts of the contents that are not displayed.

7. The method as recited in claim 5 further comprising:
   obtaining configuration parameters of a second virtual screen in response to an occurrence of a second trigger event;
   determining a scope of the second virtual screen according to the configuration parameters of the second virtual screen;
   displaying within the determined scope of the second virtual screen; and
   closing the display of the screen of the mobile terminal outside the determined scope of the second virtual screen.

8. The method as recited in claim 7, wherein the configuration parameters of the second virtual screen comprise a priority of the second virtual screen.

9. The method as recited in claim 8, wherein in response to obtaining the configuration parameters of the second virtual screen, further determining whether the priority in the configuration parameters of the second virtual screen is higher than a priority in the configuration parameters of the first virtual screen;
   in response to the priority in the configuration parameters of the second virtual screen being higher than the priority in the configuration parameters of the first virtual screen, determining the scope of the second virtual screen according to the configuration parameters of the second virtual screen; and
   in response to the priority in the configuration parameters of the second virtual screen not being higher than the priority in the configuration parameters of the first virtual screen, keeping the first virtual screen unchanged.

10. A computer program product embodied in a computer readable storage medium for saving power for a mobile terminal, the computer program product comprising the programming instructions for:
   obtaining configuration parameters of a first virtual screen in response to an occurrence of a first trigger event, wherein the first virtual screen is at least part of a screen of the mobile terminal;
   determining a scope of the first virtual screen according to the configuration parameters of the first virtual screen;
   displaying contents to be displayed on the screen of the mobile terminal within the determined scope of the first virtual screen; and
   closing the display of the screen of the mobile terminal outside the determined scope of the first virtual screen;
   wherein the programming instructions for displaying of the contents to be displayed on the screen of the mobile terminal within the determined scope of the first virtual screen comprises the programming instructions for:
      determining whether the contents go beyond the determined scope of the first virtual screen.

11. The computer program product as recited in claim 10, wherein the configuration parameters of the first virtual screen comprise a position of the first virtual screen.

12. The computer program product as recited in claim 10, wherein the configuration parameters of the first virtual screen comprise an adjustable physical parameter of the first virtual screen.

13. The computer program product as recited in claim 10 further comprising the programming instructions for:
   in response to the contents going beyond the determined scope of the first virtual screen, amending the contents so as to display all the contents within the determined scope of the first virtual screen.

14. The computer program product as recited in claim 10 further comprising the programming instructions for:
   in response to the contents going beyond the determined scope of the first virtual screen, displaying part of the contents within the determined scope of the first virtual screen.

15. The computer program product as recited in claim 14 further comprising the programming instructions for:
   providing a scroll bar so as to view parts of the contents that are not displayed.

16. The computer program product as recited in claim 14 further comprising the programming instructions for:
   obtaining configuration parameters of a second virtual screen in response to an occurrence of a second trigger event;
   determining a scope of the second virtual screen according to the configuration parameters of the second virtual screen;
   displaying within the determined scope of the second virtual screen; and
   closing the display of the screen of the mobile terminal outside the determined scope of the second virtual screen.

17. The computer program product as recited in claim 16, wherein the configuration parameters of the second virtual screen comprise a priority of the second virtual screen.

18. The computer program product as recited in claim 17 further comprising the programming instructions for:
   in response to obtaining the configuration parameters of the second virtual screen, determining whether the priority in the configuration parameters of the second virtual screen is higher than a priority in the configuration parameters of the first virtual screen;
   in response to the priority in the configuration parameters of the second virtual screen being higher than the priority in the configuration parameters of the first virtual screen, determining the scope of the second virtual screen according to the configuration parameters of the second virtual screen; and
   in response to the priority in the configuration parameters of the second virtual screen not being higher than the priority in the configuration parameters of the first virtual screen, keeping the first virtual screen unchanged.

19. A system, comprising:
a memory unit for storing a computer program for saving power for a mobile terminal; and
a processor coupled to the memory unit, wherein the processor, responsive to the computer program, comprises:
   circuitry for obtaining configuration parameters of a first virtual screen in response to an occurrence of a first trigger event, wherein the first virtual screen is at least part of a screen of the mobile terminal;
   circuitry for determining a scope of the first virtual screen according to the configuration parameters of the first virtual screen;
   circuitry for displaying contents to be displayed on the screen of the mobile terminal within the determined scope of the first virtual screen; and
   circuitry for closing the display of the screen of the mobile terminal outside the determined scope of the first virtual screen;
wherein the circuitry for displaying of the contents to be displayed on the screen of the mobile terminal within the determined scope of the first virtual screen comprises:
   circuitry for determining whether the contents go beyond the determined scope of the first virtual screen.

20. The system as recited in claim 19, wherein the configuration parameters of the first virtual screen comprise a position of the first virtual screen.

21. The system as recited in claim 19, wherein the configuration parameters of the first virtual screen comprise an adjustable physical parameter of the first virtual screen.

22. The system as recited in claim 19, wherein the processor further comprises:
   in response to the contents going beyond the determined scope of the first virtual screen, circuitry for amending the contents so as to display all the contents within the determined scope of the first virtual screen.

23. The system as recited in claim 19, wherein the processor further comprises:
 in response to the contents going beyond the determined scope of the first virtual screen, circuitry for displaying part of the contents within the determined scope of the first virtual screen.

24. The system as recited in claim 23, wherein the processor further comprises:
 circuitry for providing a scroll bar so as to view parts of the contents that are not displayed.

25. The system as recited in claim 23, wherein the processor further comprises:
 circuitry for obtaining configuration parameters of a second virtual screen in response to an occurrence of a second trigger event;
 circuitry for determining a scope of the second virtual screen according to the configuration parameters of the second virtual screen;
 circuitry for displaying within the determined scope of the second virtual screen; and
 circuitry for closing the display of the screen of the mobile terminal outside the determined scope of the second virtual screen.

\* \* \* \* \*